(12) United States Patent
Paschal

(10) Patent No.: US 11,603,947 B2
(45) Date of Patent: *Mar. 14, 2023

(54) MAGNETIC LOCKING OR OPENING DEVICE, METHOD AND SYSTEM

(71) Applicant: Dynamic Magnetics, LLC, Franklin, TN (US)

(72) Inventor: Richard C. Paschal, Nashville, TN (US)

(73) Assignee: DYNAMIC MAGNETICS, LLC, Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,286

(22) Filed: May 23, 2022

(65) Prior Publication Data

US 2022/0364656 A1 Nov. 17, 2022

Related U.S. Application Data

(63) Continuation of application No. 17/129,768, filed on Dec. 21, 2020, now Pat. No. 11,339,893.

(60) Provisional application No. 62/951,785, filed on Dec. 20, 2019.

(51) Int. Cl.
*F16K 31/08* (2006.01)
*F16K 17/36* (2006.01)

(52) U.S. Cl.
CPC ............ *F16K 31/084* (2013.01); *F16K 17/36* (2013.01); *F16K 31/086* (2013.01)

(58) Field of Classification Search
CPC .......... F16K 31/084; F16K 31/08; F16K 17/36
See application file for complete search history.

(56) References Cited

U.S. PATENT DOCUMENTS

| | | | | | |
|---|---|---|---|---|---|
| 2,637,331 | A | ‡ | 5/1953 | Sullivan | F16K 17/36 137/39 |
| 2,667,895 | A | * | 2/1954 | Pool | F16K 31/08 235/201 ME |
| 2,869,563 | A | ‡ | 1/1959 | Schoengrun | F16K 31/08 137/43 |
| 3,212,751 | A | ‡ | 10/1965 | Hassa | F16K 31/086 251/65 |
| 3,233,625 | A | * | 2/1966 | Pase | G01F 23/64 251/75 |

(Continued)

FOREIGN PATENT DOCUMENTS

| | | | | | |
|---|---|---|---|---|---|
| DE | 1156616 | B | * | 1/1961 | ........... F16K 31/086 |
| DE | 1156616 | B | ‡ | 10/1963 | ........... F16K 31/086 |

*Primary Examiner* — Umashankar Venkatesan
(74) *Attorney, Agent, or Firm* — Bass, Berry & Sims, PLC; Shu Chen

(57) ABSTRACT

An emergency shut-off device comprises an activation means configured to generate an activation force in response to detecting a seismic event, and a magnetic driver having a hollow guide tube with two magnets affixed at a selected position on opposite sides along a length of the guide tube with like poles facing each other and a drive piston movable inside the guide tube. The driver piston is coupled to a third magnet and has a first end for receiving an activation force to move the third magnet crossing a magnetic repulse shift line formed by the two magnets, and a second end for applying the drive force to an output system to effectuate a shut-off of a fluid line.

20 Claims, 9 Drawing Sheets

(56) References Cited

U.S. PATENT DOCUMENTS

| | | | | |
|---|---|---|---|---|
| 3,779,262 | A ‡ | 12/1973 | Manning | F16K 17/36 |
| | | | | 137/38 |
| 4,817,657 | A ‡ | 4/1989 | Kovacs | F16K 17/36 |
| | | | | 137/38 |
| 5,052,429 | A ‡ | 10/1991 | Yoo | F16K 17/366 |
| | | | | 137/38 |
| 6,112,764 | A ‡ | 9/2000 | Engdahl | F16K 17/36 |
| | | | | 137/38 |
| 10,359,125 | B2 ‡ | 7/2019 | Hübner | B67C 11/04 |
| 2008/0211323 | A1 * | 9/2008 | Graffin | H01F 7/0242 |
| | | | | 310/12.25 |
| 2009/0043324 | A1 ‡ | 2/2009 | Paschal | A61B 5/150022 |
| | | | | 606/181 |
| 2013/0052497 | A1 * | 2/2013 | Noh | H01M 50/308 |
| | | | | 429/82 |
| 2018/0291705 | A1 ‡ | 10/2018 | Paulo | E21B 34/04 |

\* cited by examiner
‡ imported from a related application

MAGNETIC LOCKING OR OPENING DEVICE, METHOD AND SYSTEM

RELATED APPLICATIONS

This application claims benefit under 35 U.S.C. § 119(e) of U.S. Provisional Patent Application 62/951,785, filed Dec. 20, 2019.

FIELD OF TECHNOLOGY

The present disclosure generally relates to a locking and/or opening device, method and system. In a preferred embodiment, the present invention relates to an emergency shut-off device that requires no electrical power.

BACKGROUND

Locking and opening mechanisms have been used in various industrial, commercial and residential contexts such as emergency exits designs, dam constructions, vehicle barriers, safe designs, ship compartment scuttles, and blast doors. Many of these devices and valves may be implemented to respond to an emergency in order to reduce the likelihood of an unwanted event from occurring, continuing, or escalating. For example, in the event of earthquakes, landslides, flood, tornadoes, leakage, or fire, a rapid emergency shutdown of pipelines that transport large volumes of liquid, natural gas, crude oil, liquid petroleum, and chemical products over long distances is essential for minimizing personal injury and property damage, as pipeline incidents present some of the most dangerous situations to emergency responders and heightened risks to the people, property and environment near pipelines. In another example, emergency release of floodgates or opening of aircraft cabin doors under some circumstances may require significant physical force in the face of serious challenges such as lack of power and difficulty of dispatching appropriate equipment and trained personnel to the emergency site.

Accordingly, there is a need for an emergency shut-off device, method, and system where significant force may be generated in response to minimal activation force without requiring electrical power.

SUMMARY

The present disclosure provides an emergency shut-off device, method, and system. In a preferred embodiment, the invention is directed to a seismic emergency shut-off device, method, and system. In other preferred embodiments, the invention is directed to an aerospace, defense, and/or nuclear weapon device, method and system in which it is useful to have one or more trigger, actuation, shut-off, opening, locking, drive, retraction or firing mechanism. In a further preferred embodiment, the devices, methods and systems according to the invention are inert, stable, temperature insensitive, require no electricity, involve no chemicals, and can be precisely calibrated and can remain ready to actuate and deliver a large amount of force instantaneously for a long period of time, e.g., even over many decades, 30 years, 50 years, 100 years, or centuries. Preferred aspects of the present disclosure include elimination of springs, batteries, and electrical power sources and minimal functional friction among components of the device, thereby providing a near unlimited functional life of the device. Further, the device according to the invention may be resettable after activation. In another preferred embodiment, the disclosed device utilities frictionless magnetic latching (non-contact) enabling an activation means which reduces the energy requirement of the device to zero.

In addition, the drive force generated by a magnetic driver of the disclosed device may be adjusted via several means even after the shut-off device has been manufactured. The present application may be suitable for any opening or closing mechanism that may require significant force with minimal activation force, high reliability, lack of electricity, and the ability to remain ready to close/open for indefinite periods of time.

In one embodiment of the present invention, the emergency shut-off device may comprise an activation means configured to generate an activation force in response to detecting a force and a magnetic driver. The force that is detected can be, for example, a seismic event. The magnetic driver may comprise a guide tube that is hollow and has a longitudinal axis; first and second magnets affixed at a selected position on opposite sides along a length of the guide tube with like poles facing each other, each magnet having a magnetic axis extending between its North and South poles, magnetic axes of first and second magnets being substantially aligned with each other to form a magnetic repulse shift line; a drive piston movable inside the guide tube along the longitudinal axis; and a third magnet coupled to the drive piston and configured to cross the magnetic repulse shift line to generate a drive force for extending the drive piston out of the guide tube. The drive piston has a first end for receiving the activation force to move the third magnet crossing the magnetic repulse shift line, and a second end for applying the drive force to an output system to effectuate shut-off.

A remarkable aspect of this device is the "zone mechanism" in the area of the magnetic shift line. In that zone, the force required to move the drive piston along the longitudinal axis right before the magnetic shift line drops to a minimal amount or near zero. In that zone, minimal force is then required to move the drive piston along the longitudinal axis across the magnetic shift line. Thereafter, the force generated by the magnets dramatically increases and moves the drive piston further along the longitudinal axis. This zone enables the design of many devices that can generate considerable magnetic force upon minimal activation energy.

Another embodiment of the present disclosure may include a method for activating an emergency shut off and a method of using an emergency shut off device. For example, the invention is preferably directed to a method for activating and using a seismic emergency shut-off device. The method may comprise generating, via an activation means, an activation force in response to detecting a force, including for example a seismic event, and applying the activation force to a magnetic driver. The magnetic driver may comprise applying the activation force to a magnetic driver; first and second magnets affixed at a selected position on opposite sides along a length of the guide tube with like poles facing each other, each magnet having a magnetic axis extending between its North and South poles, magnetic axes of first and second magnets being substantially aligned with each other to form a magnetic repulse shift line; a drive piston movable inside the guide tube along the longitudinal axis; and a third magnet coupled to the drive piston and configured to cross the magnetic repulse shift line to generate a drive force for extending the drive piston out of the guide tube. The method further comprises receiving the activation force, by a first end of the drive piston, to move the third magnet across the magnetic repulse shift line; and applying the drive force, by a second end of the drive piston to an output system, to effectuate a shut-off.

In yet another embodiment of the present application, an emergency shut-off device may comprise an activation means configured to generate an activation force in response to detecting a force, including for example a seismic event, and a magnetic driver. The magnetic driver may comprise a guide tube that is hollow and has a longitudinal axis; first and second magnets affixed at a selected position on opposite sides along a length of the guide tube with like poles facing each other, each magnet having a magnetic axis extending between its North and South poles, magnetic axes of first and second magnets being substantially aligned with each other to form a magnetic repulse shift line; a drive piston movable inside the guide tube along the longitudinal axis; and a third magnet coupled to the drive piston and configured to cross the magnetic repulse shift line to generate a drive force for extending the drive piston out of the guide tube. The first and second magnets are configured to be movable along the longitudinal axis and the magnetic axis to change the drive force generated by the third magnet. The drive piston has a first end for receiving the activation force to move the third magnet crossing the magnetic repulse shift line, and a second end for applying the drive force to an output system to effectuate a shut-off of a fluid line.

In an additional embodiment of the present disclosure, an emergency shut-off method may comprise generating, via an activation means, an activation force in response to detecting a force, including for example a seismic event, and applying the activation force to a magnetic driver. The magnetic driver may comprise applying the activation force to a magnetic driver; first and second magnets affixed at a selected position on opposite sides along a length of the guide tube with like poles facing each other, each magnet having a magnetic axis extending between its North and South poles, magnetic axes of first and second magnets being substantially aligned with each other to form a magnetic repulse shift line; a drive piston movable inside the guide tube along the longitudinal axis; and a third magnet coupled to the drive piston and configured to cross the magnetic repulse shift line to generate a drive force for extending the drive piston out of the guide tube. The first and second magnets are configured to be movable along the longitudinal axis and the magnetic axis to change the drive force generated by the third magnet. The method further comprises receiving the activation force, by a first end of the drive piston, to move the third magnet crossing the magnetic repulse shift line; and applying the drive force, by a second end of the drive piston to an output system, to effectuate a shut-off of a fluid line.

Moreover, the present disclosure provides a magnetic driver device, comprising: a frame member that is hollow and has a longitudinal axis; first and second magnets placed at a selected position on opposite sides along a length of the frame member with like poles facing each other, each magnet having a magnetic axis extending between its North and South poles, magnetic axes of first and second magnets being substantially aligned with each other to form a magnetic repulse shift line; a drive piston movable inside the frame member along the longitudinal axis; and a third magnet coupled to the drive piston and configured to cross the magnetic repulse shift line to generate a drive force for extending the drive piston out of the frame member. The first and second magnets are configured to be movable along the longitudinal axis and the magnetic axis to change the drive force generated by the third magnet.

The above summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1A:
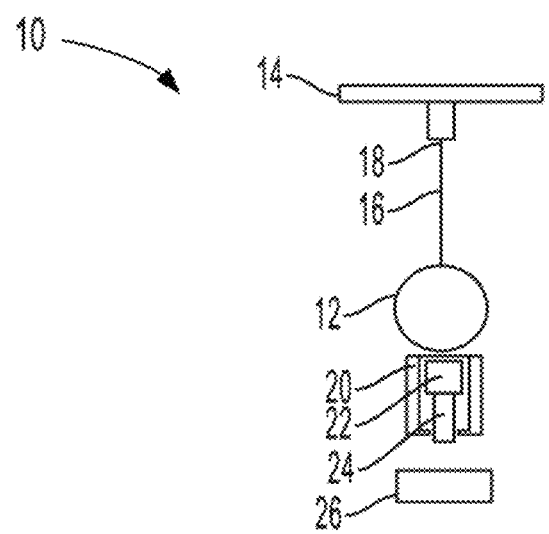
FIGS. 1(a)-1(c) illustrate an example activation and auto reset means for an emergency shut-off device.

Various aspects of the present disclosure will be described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below.

Figure 1B:
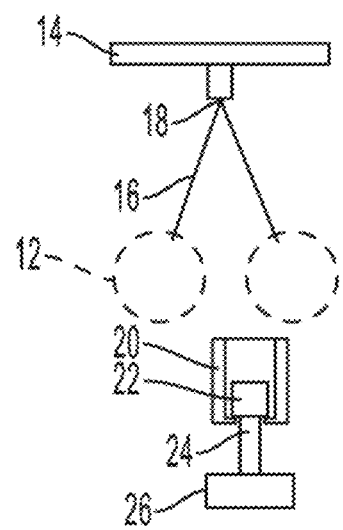
Figure 1C:
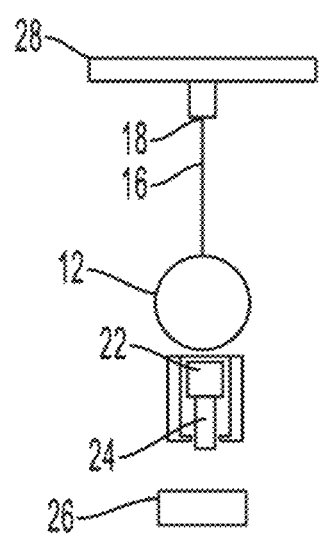

Referring to FIGS. 1(a)-1(c), an activation means and auto reset means 10 for an emergency shut-off device is illustrate, according to one embodiment of the present disclosure. In FIG. 1(a), a steel ball 12 of the activation means may be suspended from a support or an attachment plate 14 by a flexible linkage 16 at point 18. A non-magnetic housing 20 may contain at least one magnet 22 attached to a steel pin 24 and provide sufficient space to allow up and down free movement of the magnet 22 and pin 24. Initially, the magnet 22 may be fixed against an upper interior surface of the non-magnetic housing 20 by an attraction force with the steel ball 12. This position may be maintained as long as there is no movement of steel ball 12.

FIG. 1(b) depicts movements of the steel ball 12 caused by, e.g., a seismic event and a resulting disruption of the magnetic attraction between the steel ball 12 and magnet 22. Due to gravity, magnet 22 may drop to a lower end of the housing 20 with the steel pin 24 contacting a surface 26 which may be configured to trigger a magnetic driver device described below in connection with FIGS. 2-8.

FIG. 1(c) depicts the post emergency event and the return of steel ball 12 to the center of gravity. As a result, the attraction relationship between the magnet 22 and the steel ball 12 may be re-established and the magnet 22 may be returned to and maintained in the pre-activation state shown in FIG. 1(a) as long as there is no movement of steel ball 12 (indicating no seismic event). The activation means and auto reset means 10 illustrated in FIGS. 1(a)-1(c) may be suitable for non-contact or frictionless triggering for emergency locking or opening applications where an extremely low amount of activation force may be required.

It should be appreciated that the emergency shut-off device of the present disclosure may utilize any suitable means or input system configured to provide an activation force to a magnetic driver device disclosed below in connection with FIGS. 2-8. Another example activation means or input system to the emergency shut-off device may include an alarm device, such as a steel ball supported and balanced on a vertical pedestal tip and falling to hit an activation plate as a result of an emergency, for example, seismic activity. Such activation plate may be connected with, for example, an activation rod 52 of a magnetic driver device 30 shown in FIG. 2. When detecting a loss of integrity of the underlying fluid line (e.g., vibratory forces and movements due to earthquake, temperature changes indicating a fire, or pressure differences signaling an imminent explosion), such seismic alarm device may be configured to generate an activation force to drive piston 44 of the magnetic driver device 30 which triggers an output system 34 to effectuate an emergency shut-off.

Figure 2:
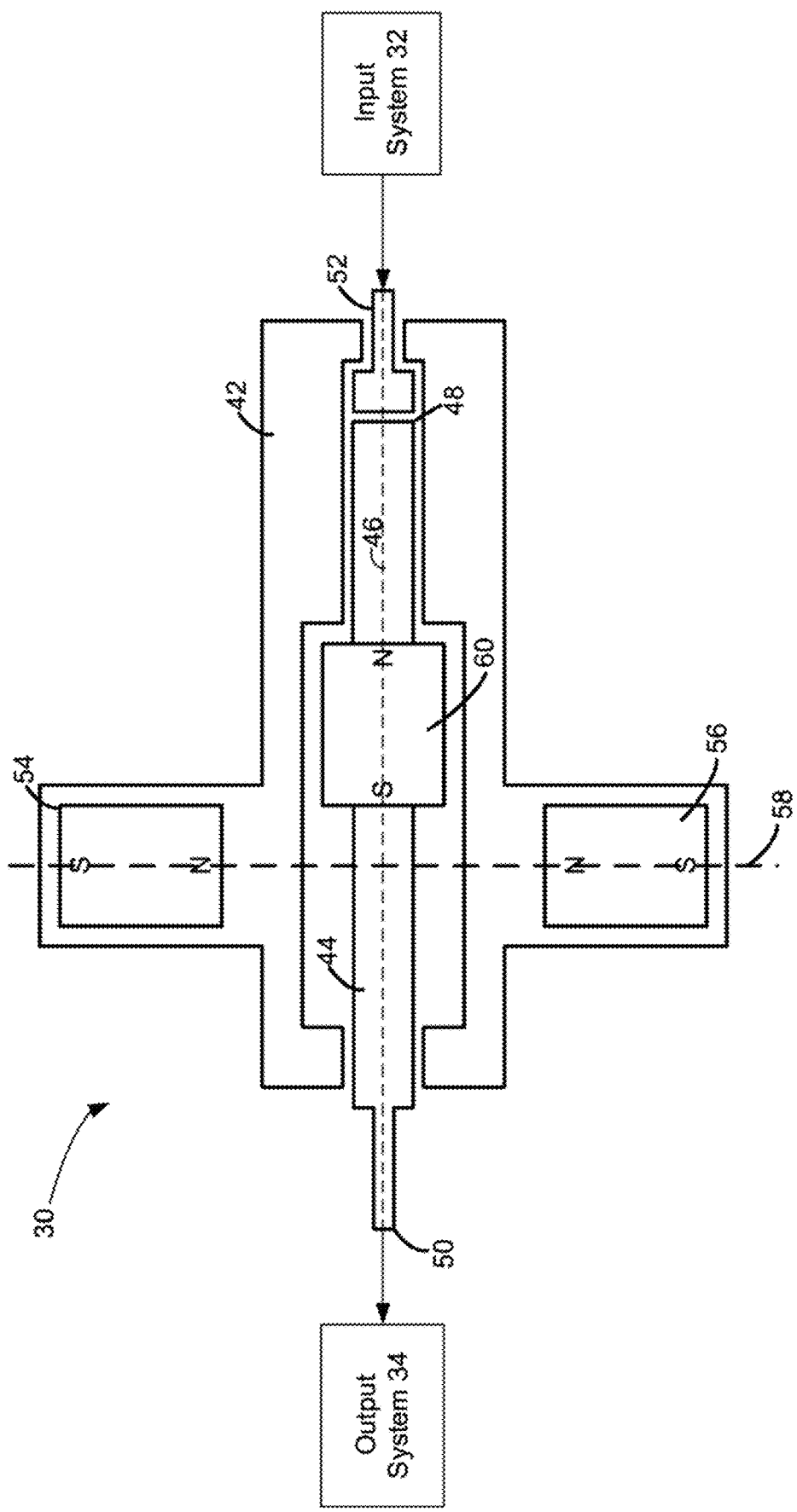
FIG. 2 illustrates an example magnetic driver of an emergency shut-off device.

As shown in FIG. 2, an embodiment of the magnetic driver device 30 may include a hollow non-magnetic guide tube 42 disposed between an input system 32 (e.g., activation means and auto reset means 10 of FIGS. 1(a)-1(c)) and an output system 34. Hollow guide tube 42 may be configured to house at least a portion of a drive piston 44 that may be movable along a longitudinal axis 46 and extends from a drive piston activation end 48 to a drive piston protruding end 50. As will be described fully below, magnetic driver device 30 may include a plurality of magnets that are configured to interact with one another to propel the drive piston 44 to extend out of the guide tube 42 with great force in response to minimal activation force applied to its activation end 48 by an activation rod 52 that is connected to the input system 32 (e.g., activation means and auto reset means 10 of FIGS. 1(a)-1(c)), such that its protruding end 50 actuates the output system 34 to effectuate a desired locking or opening mechanism, as will be described fully below.

In one preferred embodiment, a pair of dipole magnets 54 and 56 may be symmetrically affixed at a selected location on opposite sides along a length of the longitudinal axis 46 of the guide tube 42 with a like pole facing each other (e.g., North poles facing each other). A dipole magnet here may refer to a magnet whose opposite poles (i.e., North and South poles) are on opposite sides of the magnet. The simplest example of a dipole magnet may include a bar magnet. Each magnet 54, 56 may have a magnetic axis extending between its North and South poles. Both magnetic axes of magnets 54 and 56 may be substantially aligned with each other to form a magnetic repulse shift line 58 which is generally perpendicular to the longitudinal axis 46 of the guide tube 42. A drive magnet 60 may be coupled to the drive piston 44 and movable inside the guide tube 42 longitudinally. Magnetic force exerted on either or both magnets 54 and 56 by the drive magnet 60 may change or reverse direction as a portion of the drive magnet 60 approaches, crosses and moves away from the magnetic repulse shift line 58. As will be described fully below, the position of the magnetic repulse shift line 58 and such portion of drive magnet needed to cross this line may vary in different embodiments depending on the dimensions, positions, and magnetic characteristics of magnets 54, 56 and 60.

Coupled to the drive piston 44 and housed within the guide tube 42, the drive magnet 60 may be dimensioned in such a way that its North and South poles may move longitudinally within the guide tube 42 relative to the magnetic repulse shift line 58 formed by the pair of magnets 54 and 56, thereby generating great force accelerating the drive piston 44 to extend out of the guide tube 42. Initially, in one example configuration as shown in FIG. 2, the North pole of drive magnet 60 may be stabilized between the North poles of magnets 54 and 56 at a position within the guide tube 42. That is, the magnetic force fields interacting between the magnets 54 and 56 may stabilize the drive magnet 60 in a fixed position. i.e., no force is present to cause any movement of the drive magnet 60 within the guide tube 42.

When the drive magnet 60 may be stabilized slightly to the right of magnetic repulse shift line 58 (e.g., by one or more stops such as the end walls of the guide tube 42) within the guide tube 42, such position may be in a repulse field yet so close to the magnetic repulse shift line 58 that only the slightest pressure on the activation end 48 of the drive piston 44 by the activation rod 52 may shift the repulse force field to the left of the magnetic repulse shift line 58. That is, pressure on the activation end 48 of the drive piston 44 may cause the North pole of the drive magnet 60 to cross the magnetic repulse shift line 58 into a left repulse field by thrusting the drive piston protruding end 50 rapidly to the left. The resulting thrusting force accelerates the drive piston 44 to extend out of the guide tube 42 to activate the output system 34. One or more stops implemented within the guide tube 42 towards the drive piston protruding end 50 or simply the end walls of the guide tube 42 may be configured to stabilize the drive magnet 60 at a position within the guide tube 42 post the actuation. The travel distance of the drive magnet 60 including the distance between the magnetic repulse shift line 58 and its eventual stop position may determine the force required to activate the repulse shift to the left. The adjustability of this distance may accommodate desired activation force of different magnitude in different application contexts.

In accordance with aspects of the present disclosure, the positional relationship between drive magnet 60 and magnets 54, 56 may be selectively adjusted in order to achieve a desired drive force generated by the magnetic driver device 30. For example, drive magnet 60 may be positioned and stabilized relatively close to magnetic repulse shift line 58 in order to reduce or minimize an actuation or trigger force to move drive magnet 60 past magnetic repulse shift line 58 to actuate the output system 34. The potential energy stored in drive magnet 60 when released may produce a resultant force for the drive piston 44 that is many multiples of the actuation force. When drive magnet 60 may be positioned near magnetic repulse shift line 58 and near an equilibrium point within hollow guide tube 42, the amount of actuating force needed to trigger drive piston 44 may be greatly minimized.

In high energy applications, for instance for mechanical systems that require a relatively significant drive force with very fast speed, strong magnets may be used in magnetic driver device 30. To prevent drive magnet 60 from being damaged due to collisions with either stops implemented within the guide tube 42 or the end walls of the guide tube 42, in some embodiments, one or more impact cushions (not shown) may be positioned within the guide tube 42. Impact cushions may be made of foam, gel, or other cushioning material that configured to disperse impact forces the drive magnet 60 may impose on other components of magnetic driver device 30 and helps slow or stop the drive magnet 60 at a desired position within the guide tube 42.

Figure 3:
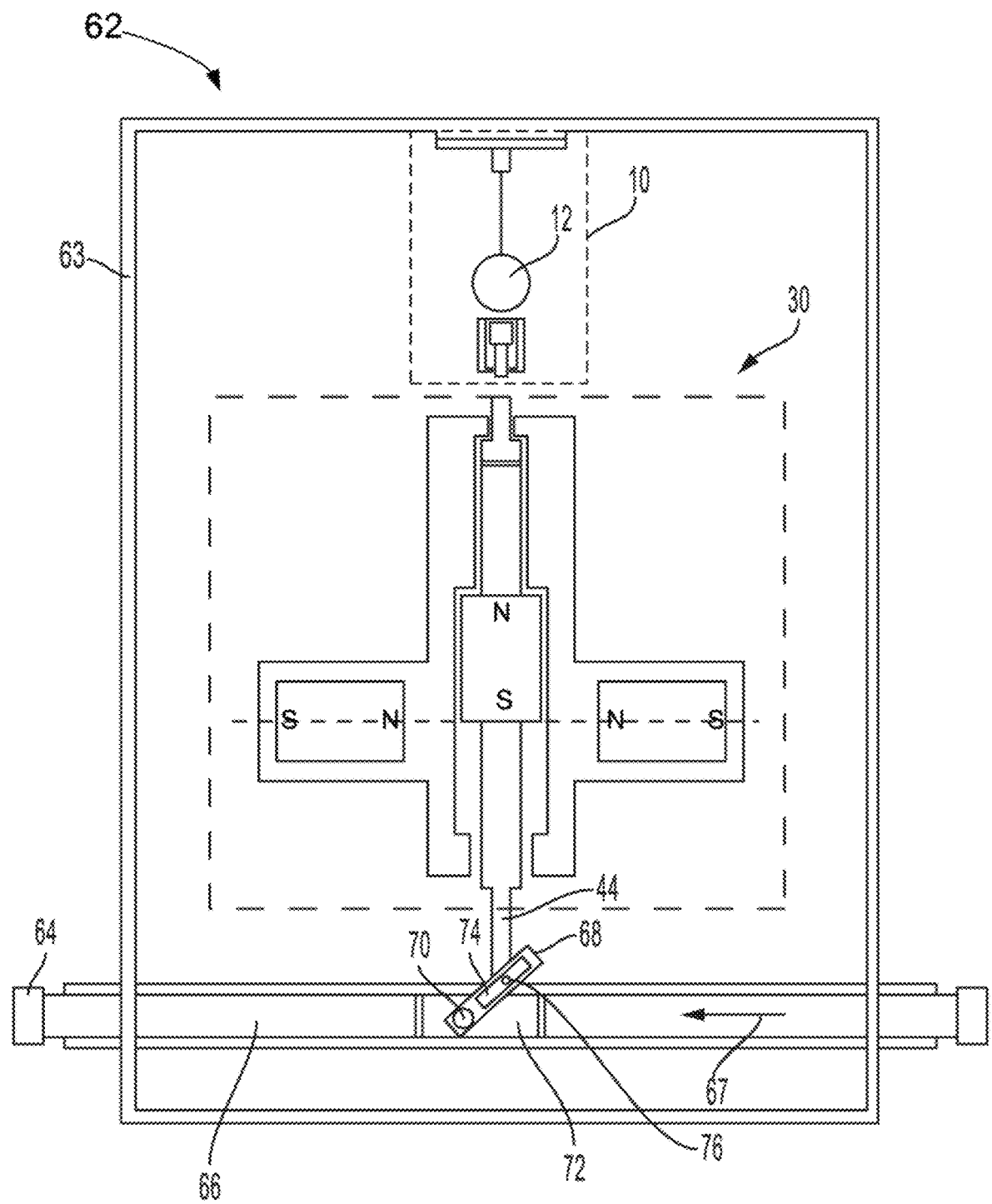
FIG. 3 illustrates an emergency shut-off device with direct linkage to a valve lever handle and installed at a selected location of a fluid line which is to be shut down in response to detection of an emergency.

Referring to FIG. 3, an example emergency shut-off system 62 may be incorporated at a selected location of a fluid line which is to be shut down in response to detection of an emergency such as earthquake or landslides. For example, system 62 may similarly utilize the activation means and auto reset means 10 described above in connection with FIGS. 1(*a*)-1(*c*). Alternatively, system 62 may be activated by direct human intervention or connected with any remote or local safety sensor that is configured to monitor one or more environmental physical or chemical parameters of the underlying fluid line against a predetermined threshold value.

In one preferred embodiment, magnetic driver device 30 of system 62 may be housed and stabilized within a non-magnetic housing 63 together with the activation means 10 using the steel ball 12. Such activation means may be attached to the top interior surface of housing 63 and positioned to activate the magnetic driver device 30 as described above in connection with FIGS. 1(*a*)-1(*c*). Housing 63 may be installed and secured on a selected portion of a pipe segment 66 of a fluid line via attachment means 64. For example, threaded attachments may be used to insert system 62 into a fluid line (arrows 67 depicting the flow direction) and secure the system 62 at a desired position. Driver piston 44 of magnetic driver device 30 may be connected with a valve shut-off lever 68 via an attachment pin 76 or any suitable connecting means. Upon activation, drive piston 44 rapidly thrusts out of the guide tube of magnetic driver device 30 and drives the lever 68 downward to accomplish a quarter turn of stem 70 and a shut-off of valve 72, thereby stopping fluid movement in the fluid line. In one embodiment, lever 68 may have space 74 allowing a connector pin 76 to slide during the transition.

Figure 4:
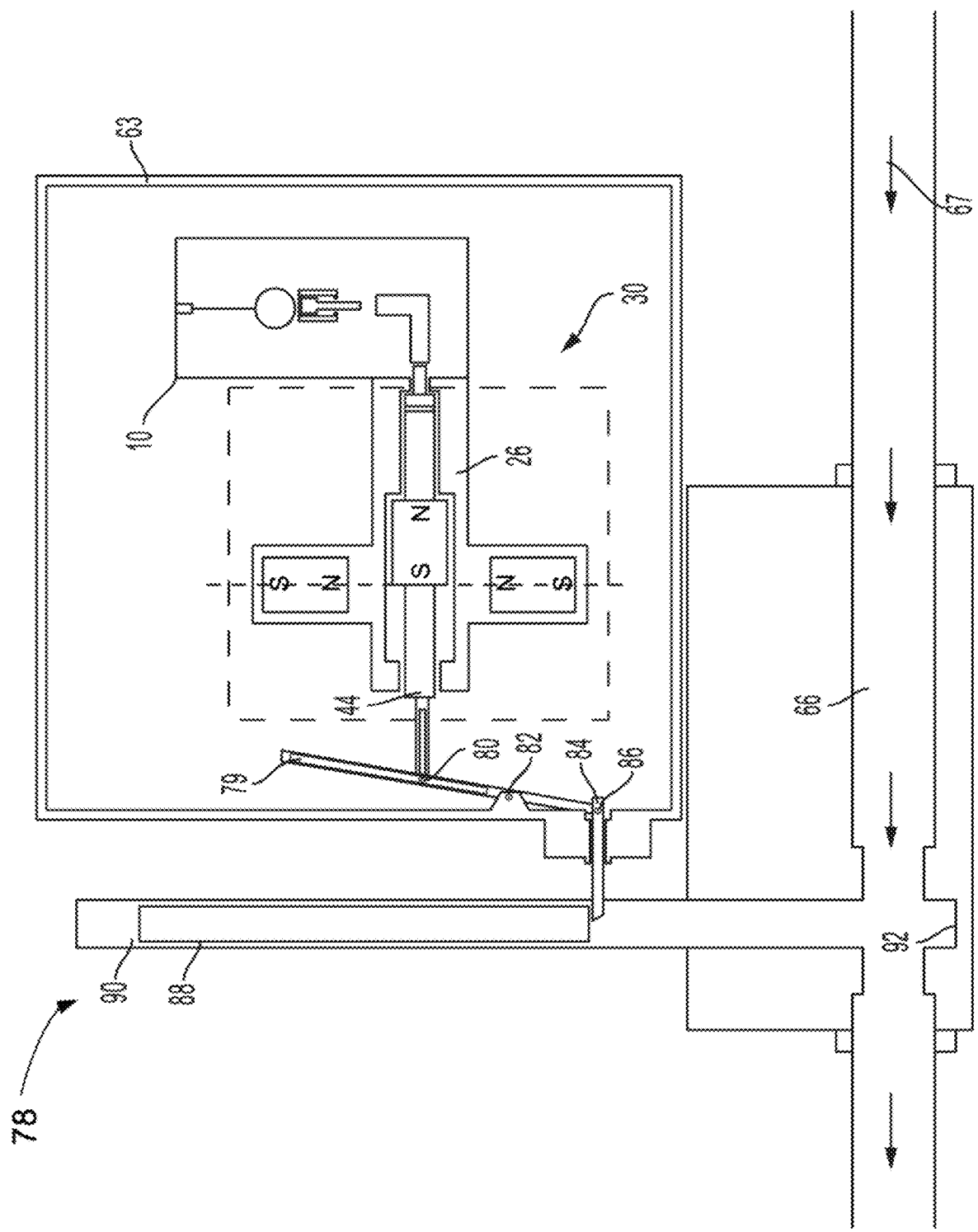
FIG. 4 illustrates another emergency shut-off device incorporating leverage and gravity to further increase work force potential and installed at a selected location of a fluid line which is to be shut down in response to detection of an emergency.

FIG. 4 depicts another example emergency shut-off system 78 which may be incorporated at a selected location of a large fluid line that ought to be shut down in response to detection of an emergency such as earthquake or landslides. Similar to system 62, magnetic driver device 30 of system 78 may be housed and stabilized within a non-magnetic housing 63 together with the activation means 10. Housing 63 may be installed and secured on a selected portion of a pipe segment 66 of a large fluid line flowing in the arrow direction 67. Utilizing gravity and stored potential energy to increase work force, system 78 may be used for extremely large industrial applications. As shown, the drive piston 44 of the magnetic driver device 30 may be connected to a lever arm 79 by a free moving pin 80. Incorporation of a lever function may significantly increase the drive force generated by system 78 to its output system. In one embodiment, lever arm 79 may be coupled to a side wall of the housing 63 via a fulcrum point 82 and connected with a release bar 84 by a free moving pin 86. The release bar 84 may be configured to hold a weight 88 maintained in a housing 90. Upon activation by the activation means and auto reset means 10 described above in connection with FIGS. 1(*a*)-1(*c*), the drive piston 44 of the magnetic driver device 30 thrusts out at a fast speed and pivots the lever arm 79 clockwise or counterclockwise around the fulcrum point 82. As a result, the release bar 84 may be withdrawn from the housing 90, thereby releasing weight 88 into the force of gravity. When weight 88 falls to a complete stop 92, the flow in the fluid line 66 may be terminated (arrows depicting the flow direction). Increasing work force by the use of gravity (weight 88 may be a thousand pounds) may enable the invention to be functional with large valves on major industrial pipelines. Resetting means of system 78 may include a ratchet jack, a counter weight, a manual chain hoist, etc.

It should be appreciated that, when the magnetic driver device 30 and the associated mechanism are housed or maintained adequately, systems 62 and 78 may function indefinitely without requiring any external energy source, such as electrical, hydraulic, spring or pneumatic power. Moreover, system 62 or 78 may be used with any fluid line and may be configured to be activated by one or more selected detection conditions such as high or low pressure of the underlying fluid line, or the presence or absence of the flow inside the fluid line. When connected with multiple sensors for monitoring the integrity of the underlying fluid line in real time, system 62 or 78 may be configured to activate emergency shutoff or opening in a timely and reliably way. In addition, system 62 or 78 may be scalable and enhanced with remote emergency and disaster management capabilities, as described below with respect to FIG. 9. Surface frictional wear of moving component parts of system 62 or 78 may be completely eliminated, as the moving part may only involve the drive piston 44 of the magnetic driver device 30, thereby reducing manufacturing and maintenance cost.

Figure 5:
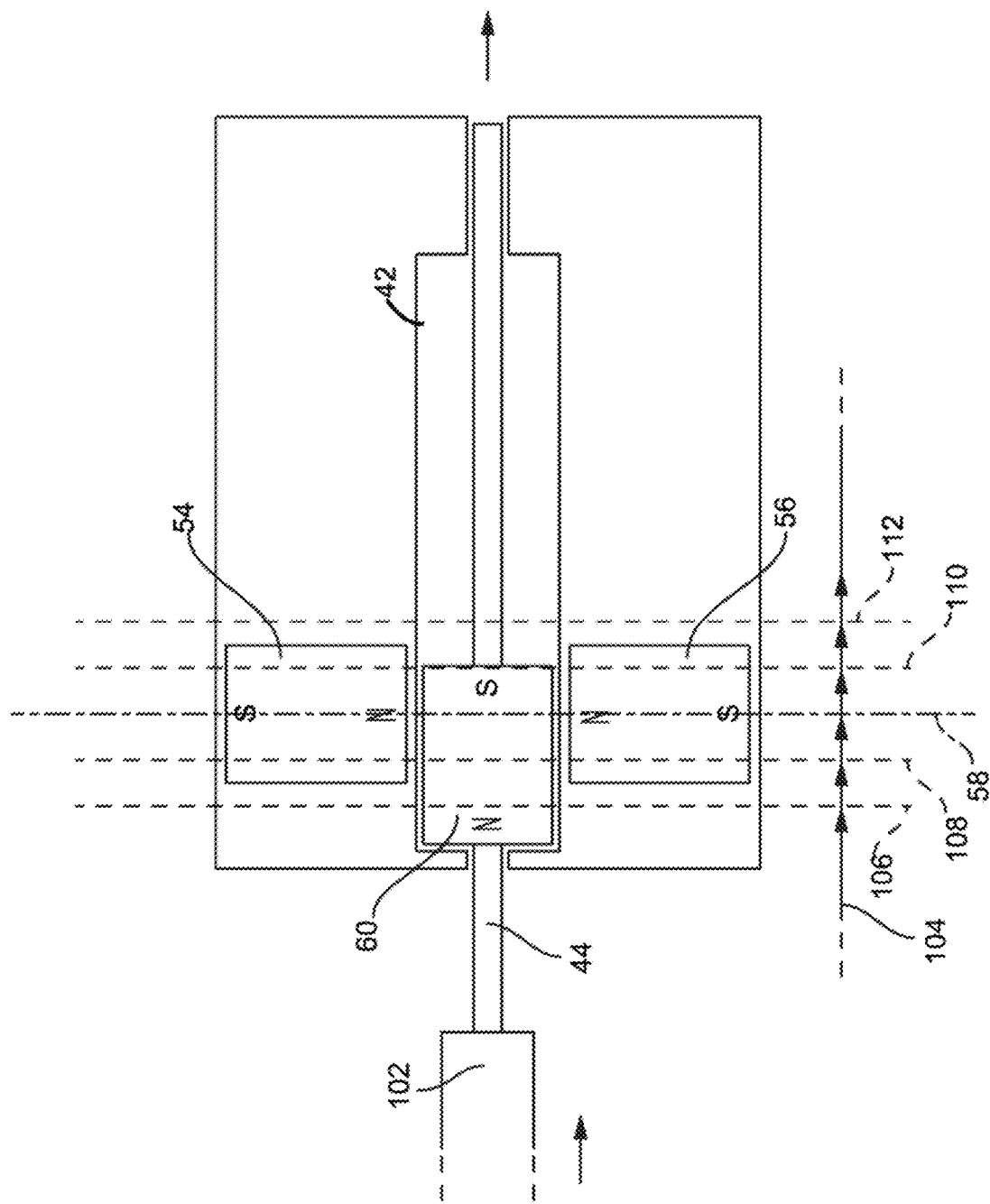
FIG. 5 is a diagram depicting magnetic interactions and activities of magnets of the magnetic driver of FIG. 2 at various points or zones.

Referring now to FIG. 5, a diagram illustrates aspects of magnetic interactions and activities of magnets 54, 56, and 60 of the magnetic driver device 30 at various points within the guide tube 42, as the drive magnet 60 is configured to approach, cross and leave the magnetic repulse shift line 58. Initially, in one example configuration as shown in FIG. 5, the South pole of drive magnet 60 may be stabilized between the North poles of magnets 54 and 56 at a position within the guide tube 42 at one distal end. As any suitable means 102 (e.g., the activation rod 52 pressuring on the activation end 48 of the drive piston 44 shown in FIG. 2) may gradually move magnet 60 from its initial position to approach the magnetic repulse shift line 58 longitudinally in the direction of 104 inside the guide tube 42.

At point 106, a first measurable magnetic interaction between magnets 54, 56, and 60 may be created (e.g., a repulse force, for example, of about 100 pounds). Between points 106 and 108, the repulse resistance may increase from, for example, 0 to 100 pounds as the North pole of drive magnet 60 may be configured to approach the magnetic repulse shift line 58 by means 102 and start interacting with the North poles of magnets 54 and 56. After peaking at point 108, such repulse resistance may steadily decline to approach 0 when the drive magnet 60 may be stabilized just slightly to the left of magnetic repulse shift line 58 at a position within the guide tube 42, and the slightest pressure on the drive piston 44 by the means 102 may shift the repulse force field from the left to the right of the magnetic repulse shift line 58. In other words, a maximum repulse resistance force may not develop at magnetic repulse shift line 58 and the repulse force may become maximized at a point (e.g., point 108) prior to line 58.

When drive magnet 60 crosses point 108 (maximum repulse resistance), the repulse resistance among like poles of magnets 54, 56, and 60 may exhibit a steady decline as the distance between the like poles of magnets 60, 54, and 56 is decreased. Furthermore, such repulse resistance may approach 0 at the threshold of repulse shift (line 58) indicating that significant levels of potential energy may be stored and converted to kinetic energy with a near zero energy requirement in the conversion process. For example, systems 62 and 78 described above in FIGS. 3 and 4 are based at least upon this frictionless magnetic latching mechanism, as the repulse force among magnets 54, 56, and 60 is not transferred to a latch involving direct contact and creating friction.

Beyond line 58 (threshold of repulse shift), the repulse force among like poles of magnets 54, 56, and 60 may be reestablished and increase from 0 to 100 pounds at point 110. Between points 110 and 112, a measurable interaction between magnets 53, 60, and 62 may decrease and reduce to 0 at point 112. In one embodiment, the functional range for the drive magnet 60 may be implemented anywhere between point 106 and line 58, but close to line 58 when used in the context of a seismic emergency shut-off device as shown in FIGS. 3 and 4.

Figure 6:
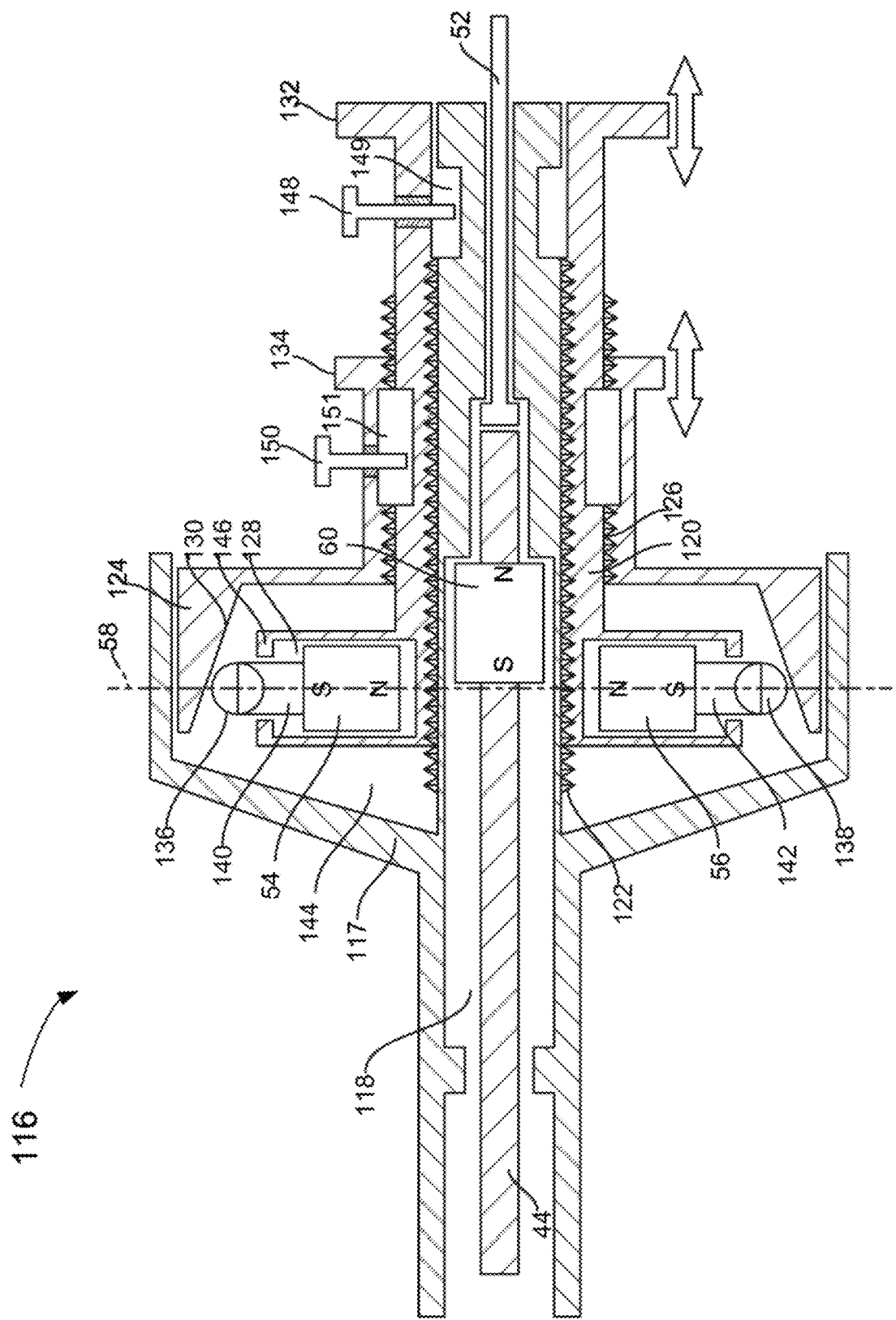
FIG. 6 illustrates an example magnetic driver designed in accordance with aspects disclosed in FIG. 5.

FIG. 6 depicts another example magnetic driver device 116, in accordance with the magnetic interactions and activities of magnets 54, 56, and 60 at various zones or points within the guide tube 42 relative to the magnetic repulse shift line 58 disclosed above in connection with FIG. 5. The embodiment in FIG. 6 have no effect on the relationship between the drive piston 44 and a target contact (e.g., an output system of the seismic emergency shut-off device). Importantly, this embodiment may enable adjustment of activation force of magnetic driver device 116 by movements of external magnets 54 and 56. It should be appreciated that, although magnetic driver device 116 of FIG. 6 may be used as a shut-off mechanism for a fluid line in response to a seismic emergency event, it may be used in various suitable application contexts which require adjustment of activation energy without affecting the position of the driver magnet 60 and the driver piston 44.

To control positions and movements of external magnets 54 and 56, a frame member 117 of magnetic driver device 116 may include a first rotating sleeve 120 threadably attached thereon at junction 122. A second rotating sleeve 124 may be likewise threadably attached to the first rotating sleeve 120 at junction 126. The first rotating sleeve 120 may be configured to house external magnets 54 and 56 in space 128 and both magnets may be held against the angled contact surfaces 130 by the repulse force created by their like poles (e.g., North poles) being in proximity to a like pole (e.g., North pole) of the drive magnet 60. Both rotating sleeves 120 and 124 may be anteriorly or posteriorly repositioned by rotation of grips 132 and 134, respectively. The resulting rotations may increase or decrease the distance between, e.g., the poles of magnets 54, 56 and 60 and/or distance between a forward facing pole of magnet 60 and the repulse shift point denoted by line 58. Such changes may result in the ability to adjust activation sensitivity in the absence of any movement of the drive magnet 60 or the drive piston 44. The drive force generated by the magnetic driver device 116 shown in FIG. 6 may be controlled and adjusted based at least upon the positions of magnets 54 and 56 relative to the drive magnet 60 which is configured to move longitudinally within hollow space 118 defined by the frame member 117.

For example, a first means to control and adjust the drive force may include incrementally adjusting the distance between the drive magnet 60 and the threshold of repulse shift (line 58) formed by magnets 54 and 56. As shown in FIG. 6, each magnet 54, 56 may be coupled with roller bearings 136, 138 movable within each respective roller bearing housing 140, 142. The first rotating sleeve 120 may be threaded circumferentially onto the outer casing of the frame member 117 to allow and control movements of magnets 54 and 56 and roller bearings 136, 138 in a direction parallel to the longitudinal axis of the frame member 117 in space 144. As the flange grip 132 of the first rotating sleeve 120 is rotated clockwise, for example, the threshold of repulse shift (line 58) may be moved further away from the drive magnet 60. Counterclockwise rotations of the grip 132 may have the opposite effect and result in a decreased distance between drive magnet 60 and line 58. As the drive magnet 60 moves closer to line 58, the force required for activation the magnetic driver device 116 may be reduced. For example, as described above in connection with FIG. 5, when the North pole of driver magnet 60 moves past the peak point 108 and in close vicinity of magnetic repulse shift line 58 formed between North poles of magnets 54 and 56, the repulse resistance among magnets 54, 56, and 60 may be the minimum (approach 0 at the threshold of repulse shill line 58). As magnetic driver device 116 may be activated by a small force, the sensitivity of the underlying emergency shut-off system may be increased. In one preferred embodiment, the activation force may be adjusted to be in a range in order to prevent accidental activation but still yield great drive force by the magnetic driver device 116.

Moreover, it is known that many conventional emergency shut-off valves may be generally sensitive primarily to horizontal shock waves not vertical shock waves. As a result, for example, a shut-off valve device of this nature when sitting directly above an epicenter of an earthquake of a given magnitude may not be activated by such an earthquake, whereas an identical valve located a distance away from the epicenter, and which is not readily subjected to quite as hard of a shock, may be properly activated. In one preferred embodiment, a plurality of seismic emergency shut-off systems disclosed in the present application may be deployed cross a geographic region. Each system may be configured to effectuate an emergency shut off of a pipeline at different locations in response to earthquake shock based at least upon each respective predetermined threshold values of activation force. As locations between each seismic emergency shut-off system and a detected epicenter of an earthquake are different, the distance between the magnetic repulse shift line 58 and the drive magnet 60 of each system may be determined and implemented individually, so each system may have different sensitivity to horizontal shock waves and/or vertical shock waves.

Moreover, a second means to control and adjust the drive force may include incrementally adjusting a distance between the drive magnet 60 and the peripheral magnets 54 and 56. As shown in FIG. 6, the second rotating sleeve 124 may be threaded circumferentially onto the first rotating sleeve 120 to allow and control movements of magnets 54, 56 and roller bearings 136, 138 in a direction perpendicular to the longitudinal axis of the frame member 117. For example, one or more stops 146 and space 128 may be provided by the second rotating sleeve 124 for such perpendicular movements of magnets 54 and 56. Further, angled contact surfaces 130 may be provided for each roller bearing 136, 138 to move thereon when the flange grip 134 rotates clockwise or counterclockwise to adjust the position of each magnet 54, 56 relative to the longitudinal outer casing of the frame member 117. In one embodiment, clockwise rotations of grip 134 of the second rotating sleeve 124 may move magnets 54 and 56 closer to drive magnet 60 and compress the repulse field therebetween to yield an increase in drive force. Counterclockwise rotations of grip 134 may decompress the repulse field therebetween and yield a decrease in drive force. Lock pins 148 and 150 may be used to fix the position of each rotating sleeve 120, 124 onto the outer casing of the frame member 117 when tightened. In one embodiment, recessed space 149 may be provided in frame member 117 to accommodate attachment and movements of lock pin 148, and recessed space 151 in the first rotating sleeve 120 for accommodating attachment and movements of lock pin 150.

As will be descried fully below in FIGS. 7 and 8, a third means to control and adjust the drive force may include controlling the stroke length of drive piston 44. Stroke length variations yield corresponding variations in the impact force of the drive piston 44 on, e.g., the target surface of an output system 206.

It should be appreciated that the above three adjustment means may be used independently or in combination with one another to enable increasing or decreasing the drive force generated by magnetic driver device 116 for specific applications even after the magnetic driver device 116 has been manufactured and installed. In addition, the strength of magnets 54, 56 and 60 selected and installed in magnetic driver device 116 may also affect the strength of the drive force generated.

Figure 7:
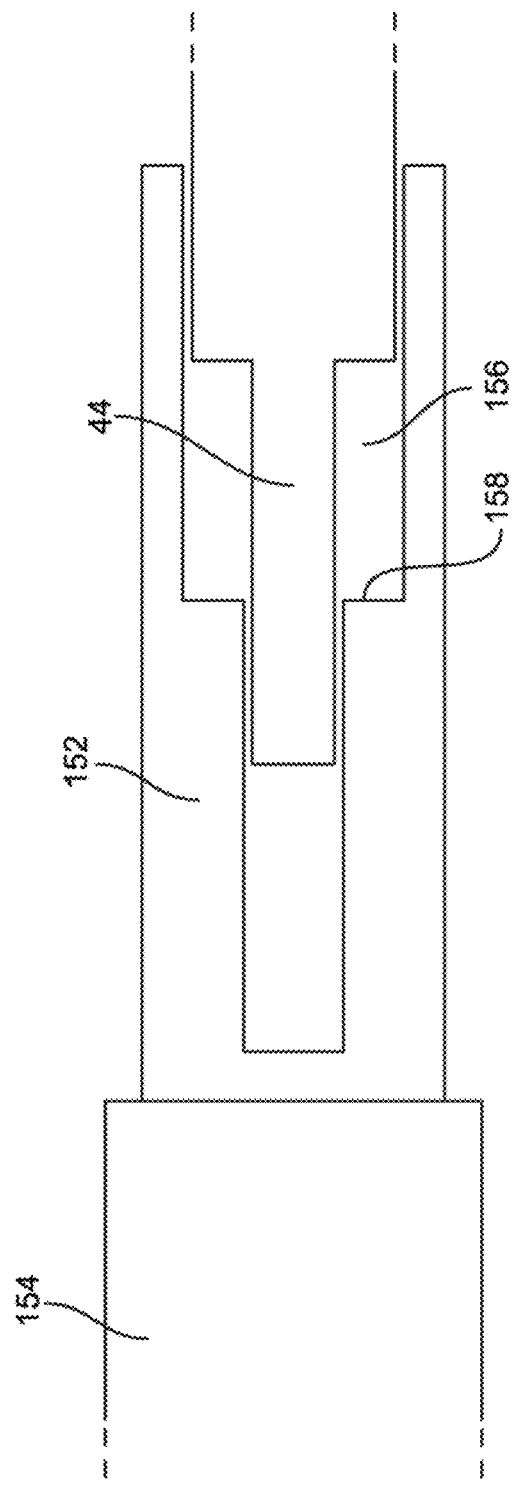
FIG. 7 illustrates an example linkage element that serves as a drive piston guide and means of identifying stroke length.
Figure 8:
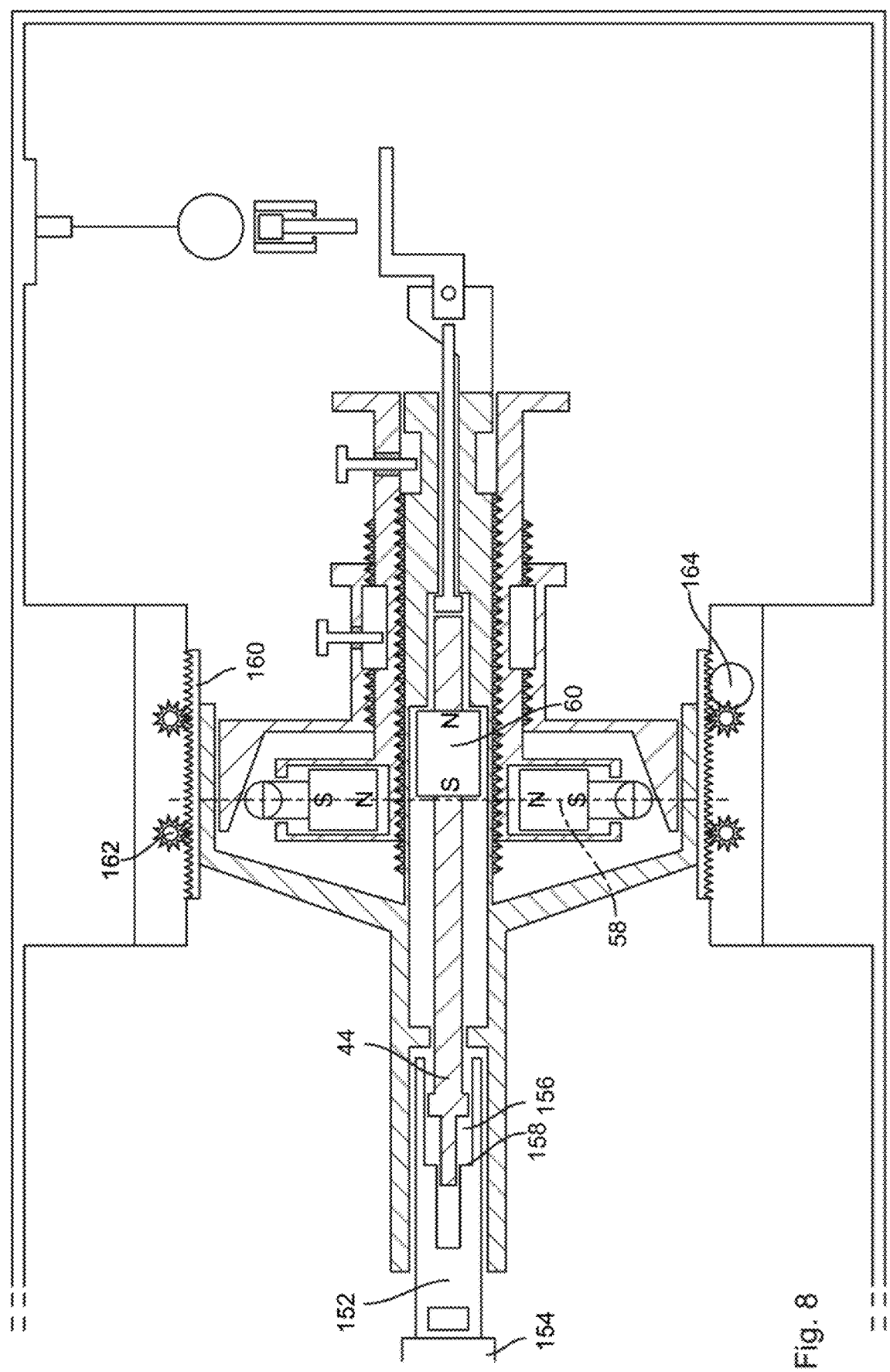
FIG. 8 illustrates an example tracking means for adjusting the stroke length.

Referring now to FIG. 7, a linkage element 152 may serve as a piston guide and may be a part of the activation (trigger) component of a driver design for a corresponding magnetic driver device. The linkage element 152 may also function as a means to identify stroke length of drive piston 44 of the magnetic driver device. In one embodiment, the linkage element 152 may be part of activation means 154 which may represent any suitable driver systems use for flow reduction as opposed to flow opening or shut-off purposes. For example, linkage element 152 may house the drive piston 44 and space 156 may be adjusted by aspects disclosed in connection with FIG. 8. For example, as shown in FIG. 8, the magnetic driver device 116 of FIG. 7 may be attached to tracking means 160 (moved by e.g., one or more gear cogs 162) which may be engaged by cogwheels enabling anterior or posterior movements of the rotating sleeves 120 and 124 by the rotation of a knob 164. Such movements may directly affects the size of space 156 which may determine a stroke length of drive piston 44 and the drive force generated by the magnetic driver device 116. That is, variations in spaces 156 may result in variations in the drive force generated by magnetic driver device 116.

For example, as space 156 may be decreased by the drive magnet 60 being moved toward line 58, the resulting drive force may be diminished. A well-defined and measurable repulse field length may exist beyond the threshold of repulse shift, as described previously. The piston drive force may be directly influenced by the distance the drive piston 44 is allowed to travel into this repulse field prior to contacting stops 158. Within the length of this field, there may exist a point of peak repulse force. Variations in the distance between a selected stop point and the peak repulse point may yield differences in drive force levels for magnetic driver device 116.

Figure 9:
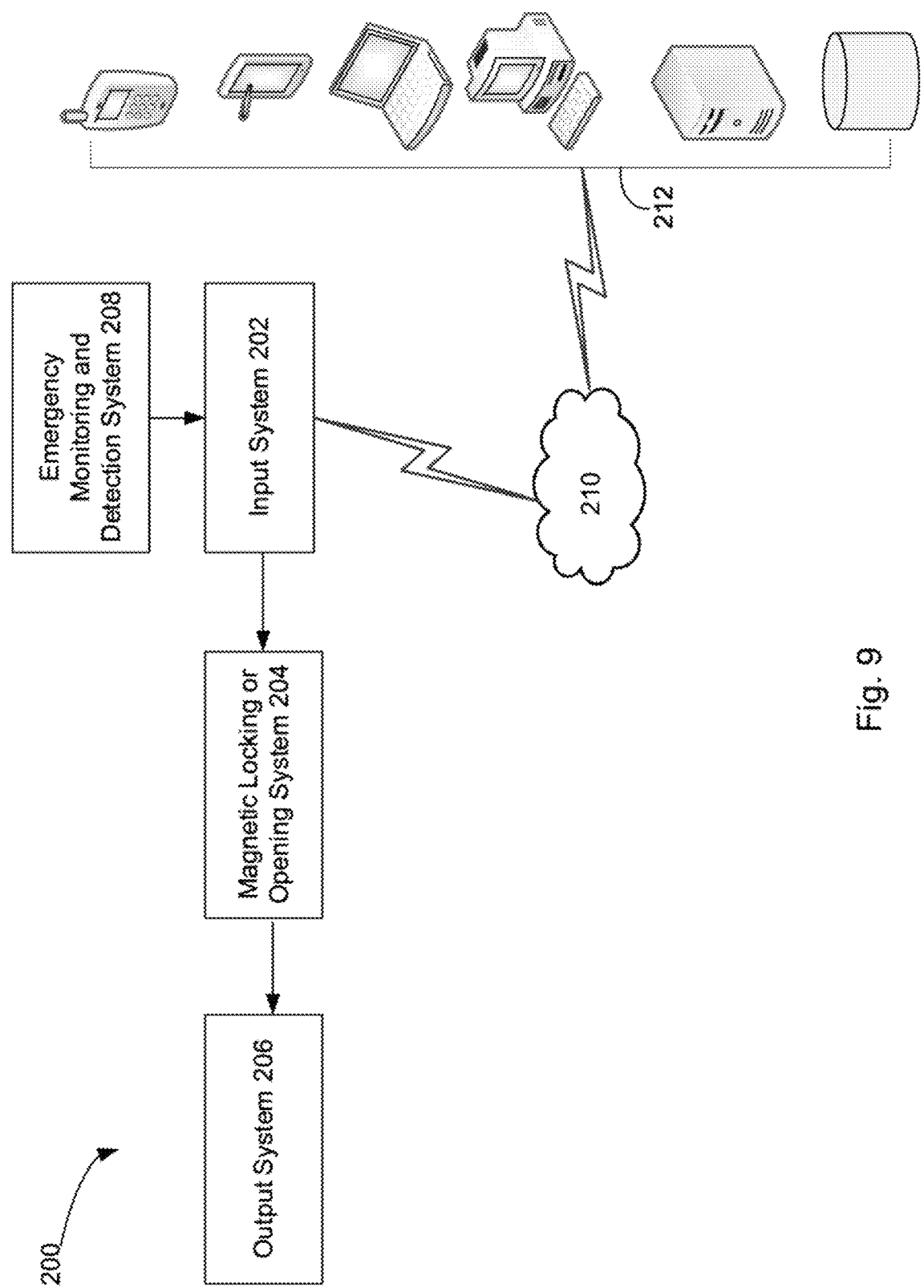
FIG. 9 illustrates an emergency locking or opening system with a remote control.

Referring to FIG. 9, an emergency shut-off system 200 with remote control may be configured to control a fluid line (e.g., a water flow, a flow of electric current, or a flow of oil and chemicals), according to aspects of the present application. On a high level, system 200 may comprise an input system 202, a magnetic locking or opening system 204 that requires no electrical, hydraulic or pneumatic power, and an output system 206. Input system 202 may include the activation means and auto reset means 10 of FIGS. 1(a)-1(c). Input system 202 may be configured to connect with at least one safety sensor associated with an emergency monitoring and detection system 208. For example, system 208 may be configured to monitor one or more environmental physical or chemical parameters of a fluid line against a predetermined threshold value and determine whether an emergency shutdown of a fluid line (e.g., vibratory forces and movements due to earthquake, temperature changes indicating a fire, or pressure differences signaling an imminent explosion) may be needed.

Furthermore, input system 202 of system 200 may be connected, via at least one communication network 210, with suitable network connections and protocols, with at least one remote computing device 212 which may comprise at least one of personal computers, servers, laptops, tablets, mobile devices, smart phones, cellular devices, portable gaming devices, media players, network enabled printers, routers, wireless access points, network appliances, storage systems, gateway devices, or any other suitable devices that are deployed in the same or different networks. Enhanced with such remote computing and processing capabilities, system 200 may be configured to be more responsive to certain conditions in locking or unlocking, e.g., an emergency exit door. It is to be appreciated that system 200 may include any suitable and/or necessary interface components, such as various adapters, connectors, channels, communication paths, for facilitating exchanging signals and data among various hardware and software components of the input system 202, the remote computing device 212, any applications, peer devices, remote or local server systems/ service providers, and additional database system(s) that are connected via underlying network connections 210 and associated communication channels and protocols (e.g., Internet, wireless, LAN, cellular, Wi-Fi, WAN). As a result, input system 202 may be configured to receive various command signals from a remote location and accordingly generate an activation force to the magnetic locking or opening system 204 to initiate a desired locking or opening mechanism depending upon the application context of system 200. Therefore, suitable safety detection sensitivity of the above-mentioned environmental physical or chemical parameters, and various control functions may be incorporated into system 200 to accommodate any contingency that may arise and trigger the magnetic locking or opening system 204.

Each of the devices, systems and methods according to the invention can also be used or adapted for use in aerospace, defense, and/or nuclear weapon device, method and system in which it is useful to have one or more trigger, actuation, shut-off, opening, locking, drive, retraction or firing mechanism. In a further preferred embodiment, the devices, methods and systems according to the invention are inert, stable, temperature insensitive, require no electricity, involve no chemicals, and can be precisely calibrated and can remain ready to actuate and deliver a large amount of force instantaneously for a long period of time, e.g., even over many decades or centuries.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A device, comprising:
a guide tube that is hollow and has a longitudinal axis;
first and second magnets placed near a distal end of the guide tube on opposite sides along a length of the guide tube with like poles facing each other, each magnet having a magnetic axis extending between its North and South poles, magnetic axes of first and second magnets being substantially aligned with each other to form a magnetic repulse shift line;
a drive piston movable inside the guide tube along the longitudinal axis; and
a third magnet coupled to the drive piston and configured to be stabilized inside the guide tube, wherein the third magnet has a magnetic axis that is perpendicular to the magnetic repulse shift line, and a pole of the third magnet is positioned at a selected distance to the magnetic repulse shift line, wherein the third magnet is configured to, in response to receiving, an activation force, move along the longitudinal axis to cross the magnetic repulse shift line to generate a drive three for extending the drive piston out of the guide tube.

2. The device of claim 1, wherein the third magnet is configured to be stabilized inside the guide tube via one or more stops implemented within the guide tube.

3. The device of claim 1, wherein the pole of the third magnet is the same as the like poles of the first and second magnets.

4. The device of claim 3, wherein the pole of the third magnet and the like poles of the first and second magnets are all North poles or all South poles.

5. The device of claim 3, wherein the pole of the third magnet is configured to be stabilized at the selected distance to the magnetic repulse shift line in order to create and maintain repulse resistance with the like poles of the first and second magnets.

6. The device of claim 5, wherein the third magnet is configured to, in response to receiving the activation force, move along the longitudinal axis to cross the magnetic repulse shift line to convert the repulse resistance to the drive force for extending the drive piston out of the guide tube.

7. The device of claim 6, wherein the repulse resistance increases when the selected distance to the magnetic repulse shift line decreases to a first location, wherein the repulse resistance peaks at the first location.

8. The device of claim 7, wherein the repulse resistance decreases when the selected distance to the magnetic repulse shift line decrease to a second location, wherein the second location is between the first location and the magnetic repulse shift line.

9. The device of claim 8, wherein the repulse resistance is near zero when the selected distance to the magnetic repulse shift line approaches zero.

10. The device of claim 9, wherein the activation force is near zero when the selected distance to the magnetic repulse shift line approaches zero.

11. The device of claim 8, wherein the drive force increases after the pole of the third magnet crosses the magnetic repulse shift line, and the drive force peaks when the pole of the third magnet reaches a third location.

12. The device of claim 11, wherein the drive force is controlled by one or more stops selectively placed within the guide tube between the magnetic repulse shift line and the third location.

13. A system, comprising:
an activation subsystem configured to generate an activation force; and
a device, comprising:
a guide tube that is hollow and has a longitudinal axis,
first and second magnets placed near a distal end of the guide tube on opposite sides along a length of the guide tube with like poles facing each other, each magnet having a magnetic axis extending between its North and South poles, magnetic axes of first and second magnets being substantially aligned with each other to form a magnetic repulse shift line,
a drive piston movable inside the guide tube along the longitudinal axis, and
a third magnet coupled to the drive piston and configured to be stabilized inside the guide tube, wherein the third magnet has a magnetic axis that is perpendicular to the magnetic repulse shift line, and a pole of the third magnet is positioned at a selected distance to the magnetic repulse shift line, wherein the third magnet is configured to, in response to receiving the activation force, move along the longitudinal axis to cross the magnetic repulse shift line to generate a drive force for extending the drive piston out of the guide tube.

14. The system of claim 13, wherein the third magnet is configured to be stabilized inside the guide tube via one or more stops implemented within the guide tube, wherein the pole of the third magnet is the same as the like poles of the first and second magnets.

15. The system of claim 14, wherein the pole of the third magnet and the like poles of the first and second magnets are all North poles or all South poles.

16. The system of claim 14, wherein the pole of the third magnet is configured to be stabilized at the selected distance to the magnetic repulse shift line in order to create and maintain repulse resistance with the like poles of the first and second magnets, wherein the third magnet is configured to, in response to receiving the activation three, move along the longitudinal axis to cross the magnetic repulse shift line to convert the repulse resistance to the drive force for extending the drive piston out of the guide tube.

17. The system of claim 16, wherein the repulse resistance increases when the selected distance to the magnetic repulse shift line decreases to a first location, wherein the repulse resistance peaks at the first location.

18. The system of claim 17, wherein the repulse resistance decreases when the selected distance to the magnetic repulse shift line decrease to a second location, wherein the second location is between the first location and the magnetic repulse shift line.

19. The system of claim 18, wherein the repulse resistance is near zero when the selected distance to the magnetic repulse shift line approaches zero, and the activation force is near zero when the selected distance to the magnetic repulse shift line approaches zero.

20. The system of claim 18, wherein the drive force increases after the pole of the third magnet crosses the magnetic repulse shift line and peaks when the pole of the third magnet reaches a third location, wherein the drive force is controlled by one or more stops selectively placed within the guide tube between the magnetic repulse shift line and the third location.

\* \* \* \* \*